US011004155B2

(12) United States Patent
Shnyr et al.

(10) Patent No.: US 11,004,155 B2
(45) Date of Patent: May 11, 2021

(54) SYSTEM FOR AND METHOD OF DETERMINING AN INCOME OF A USER OF A MOBILE DEVICE

(71) Applicant: YANDEX EUROPE AG, Lucerne (CH)

(72) Inventors: Leonid Aleksandrovich Shnyr, Vologda (RU); Andrey Borisovich Krasnikov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 430 days.

(21) Appl. No.: 15/861,976

(22) Filed: Jan. 4, 2018

(65) Prior Publication Data

US 2018/0293666 A1 Oct. 11, 2018

(30) Foreign Application Priority Data

Apr. 5, 2017 (RU) .......................... RU2017111482

(51) Int. Cl.
*G06N 20/20* (2019.01)
*G06Q 40/00* (2012.01)
(Continued)

(52) U.S. Cl.
CPC ............ *G06Q 40/12* (2013.12); *G06N 20/00* (2019.01); *G06N 20/20* (2019.01); *G06Q 10/1091* (2013.01); *G06Q 40/125* (2013.12)

(58) Field of Classification Search
CPC ...... G06Q 30/02; G06Q 10/063; G06Q 20/32; G06Q 10/087; G06Q 10/043;
(Continued)

(56) References Cited

U.S. PATENT DOCUMENTS 9,280,749 B1 3/2016 Porteous et al.
2007/0055621 A1* 3/2007 Tischler ................. G06Q 40/02
705/38
(Continued)

FOREIGN PATENT DOCUMENTS

JP 2010531626 * 9/2010 ............. G06Q 30/20
RU 2391791 C2 6/2010

OTHER PUBLICATIONS

Ying, Josh Jia-Ching, et al. "Demographic prediction based on users mobile behaviors." Mobile Data Challenge (2012): 1-6. (Year: 2012).*

(Continued)

*Primary Examiner* — Matthew S Gart
*Assistant Examiner* — Hamzeh Obaid
(74) *Attorney, Agent, or Firm* — BCF LLP

(57) ABSTRACT

A method of determining an income of a user of a mobile device, the method comprising: acquiring device data associated with the user of the mobile device; associating the user with a first occupational class, the first occupational class being associated with at least one event type and a first MLA; extracting a first dataset from the device data based on the first occupational class; applying a first logical analysis of the first MLA to the first dataset, the applying comprises: extracting from the first dataset a first data pattern being indicative of a first occupational event performed by the user, the first data pattern being associated with one of the at least one event types; and determining a first income value associated with the first occupational event based on the first data pattern, the first income value being representative of an income of the user of the mobile device.

10 Claims, 7 Drawing Sheets

(51) Int. Cl.
*G06N 20/00* (2019.01)
*G06Q 10/10* (2012.01)

(58) Field of Classification Search
CPC ........... G06Q 10/0838; G06Q 10/1091; G06N 20/00; B65G 57/03; B65G 61/00
See application file for complete search history.

(56) References Cited

U.S. PATENT DOCUMENTS

| | | | |
|---|---|---|---|
| 2010/0203876 A1 | 8/2010 | Krishnaswamy | |
| 2012/0036018 A1 | 2/2012 | Feliciano et al. | |
| 2012/0239416 A1* | 9/2012 | Langva | G06Q 40/08 705/2 |
| 2012/0284052 A1 | 11/2012 | Saukas et al. | |
| 2014/0006060 A1* | 1/2014 | Sehnal | G06Q 10/0631 705/4 |
| 2014/0164369 A1 | 6/2014 | Nichols et al. | |
| 2014/0214709 A1* | 7/2014 | Greaney | G06Q 10/1053 705/321 |
| 2014/0344128 A1 | 11/2014 | Nikankin et al. | |
| 2015/0170304 A1 | 6/2015 | Diamond | |
| 2015/0348059 A1 | 12/2015 | Agara et al. | |
| 2016/0371661 A1* | 12/2016 | Shah | G06Q 20/401 |
| 2017/0098197 A1* | 4/2017 | Yu | G06Q 30/02 |
| 2018/0129940 A1* | 5/2018 | Qian | G06Q 10/10 |

OTHER PUBLICATIONS

Matic, Aleksandar, et al. "Virtual uniforms: using sound frequencies for grouping individuals." Proceedings of the 2013 ACM conference on Pervasive and ubiquitous computing adjunct publication. 2013. (Year: 2013).*

Zhong, Erheng, et al. "User demographics prediction based on mobile data." Pervasive and mobile computing 9.6 (2013): 823-837. (Year: 2013).*

Kim, In-Cheol, Joo-Hee Kim, and Seok-Jun Lee. "Mobilesense: A robust sound classification system for mobile applications." IWSSIP 2014 Proceedings. IEEE, 2014. (Year: 2014).*

Malmi, Eric, and Ingmar Weber. "You are what apps you use: Demographic prediction based on user's apps." Tenth International AAAI Conference on Web and Social Media. 2016. (Year: 2016).*

Preotiuc-Pietro, Daniel, et al. "Studying user income through language, behaviour and affect in social media." PloS one 10.9 (2015). (Year: 2015).*

RU Search Report with regard to the counterpart patent application RU2017111482 completed Jul. 10, 2018.

* cited by examiner

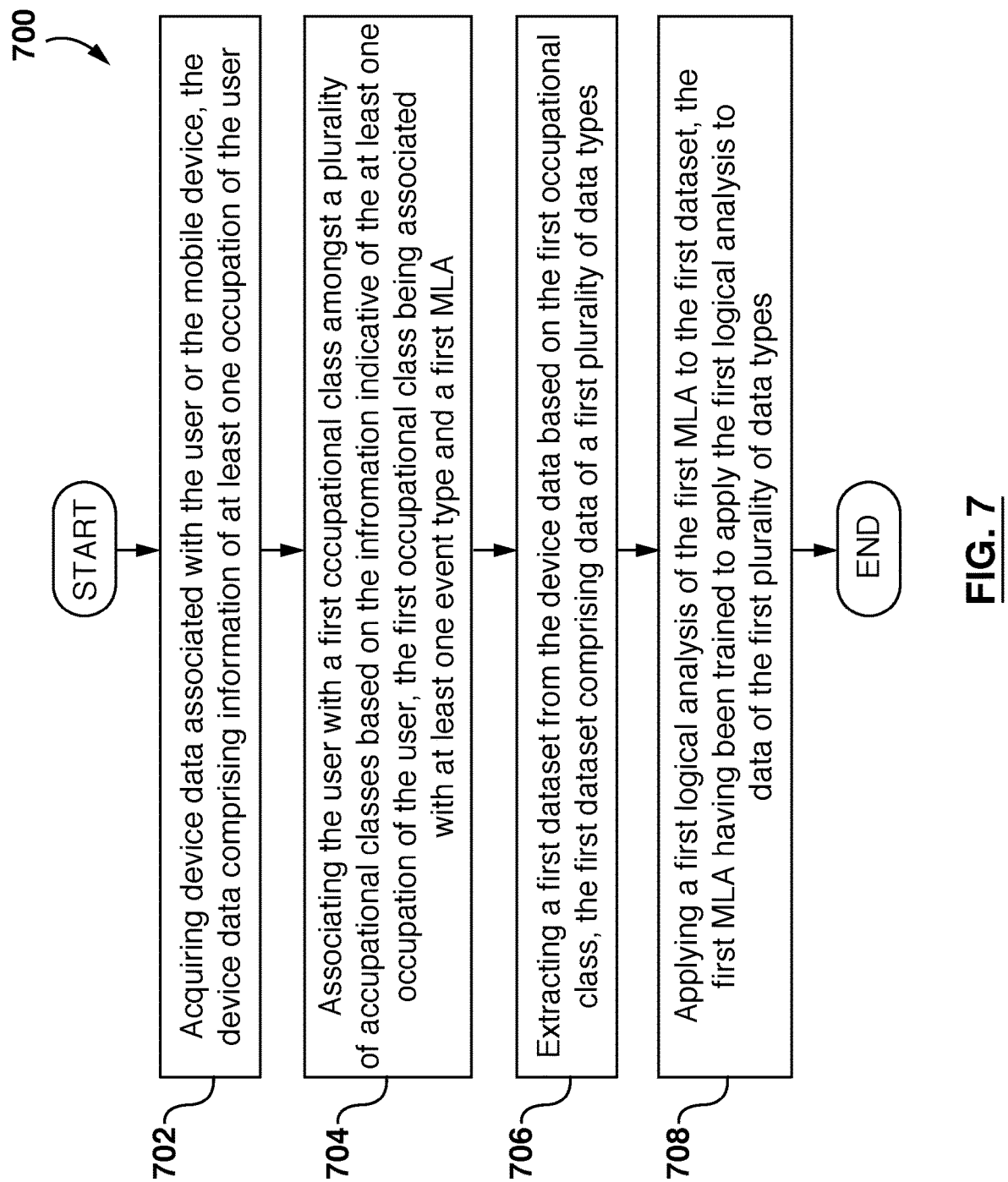

SYSTEM FOR AND METHOD OF DETERMINING AN INCOME OF A USER OF A MOBILE DEVICE

CROSS-REFERENCE

The present application claims priority to Russian Patent Application No. 2017111482, entitled "System For And Method Of Determining An Income Of A User Of A Mobile Device," filed on Apr. 5, 2017, the entirety of which is incorporated herein by reference.

TECHNICAL FIELD

The present technology relates to user ranking in general and specifically to a method and apparatus for determining the income of a user of a mobile device.

BACKGROUND

Mobile devices have evolved beyond simple telephone functionality and are now more complex multi-functional devices. In addition to voice communications, many mobile devices are capable of text messaging, email communications, Internet access, geographical localization, and the ability to run application software. For example, mobile devices can use these capabilities to perform online transactions and searches for relevant content. Furthermore, mobile devices may also be used by an individual in order to store and manage their job related information such as emails, work schedules, job related tasks, etc. The mobile device may also run a plethora of applications that render the management of such job related information a convivial and user-friendly exercise that results in productivity boost of the individual.

Applications that run on the mobile device may, for example, be downloaded and installed from an application marketplace. For instance, an application marketplace may be the Google Play™ service or AppStore™ provided by Apple Corporation. Some of these applications may also be provided by the employer directly and where the applications have been developed internally by the employer. This facilitates data gathering and management of job related information. However, a large number of users are not subscribed to such management services or are not provided with such applications by their employer and, as such, gathering and management of job related information associated with these users becomes a very difficult task to achieve.

Furthermore, user classification based on job related information is becoming a popular task in the industry for several reasons such as: updating user profiles, determining and providing user-specific content, tracking hours worked, ensuring workers get enough rest between shifts, etc. A common approach to user classification based on job related information is to assign each user to a specific group of users which share at least some common job related information. For example, the users may be classified by associating each user to a respective monetary income interval. However, differentiating users amongst each other based on job related information, especially when the users are assigned to an identical interval, is a much more complex task. In other words, user ranking based on job related information may be harder to achieve that a simple classification of users into specific user groups.

SUMMARY

Developers of the present technology have appreciated certain technical drawbacks associated with user classification based on job related information. Embodiments of the present technology aim at leveraging the immense amount of GPS and sensor data in order to recognize implicit data patterns therein, which implicit data patterns are associated with work related activities of the user. Without being bound to any specific theory, embodiments of the present technology enable an assignment of personalized attributes to users based on implicit data patterns that are extracted from mobile device data. The personalized attributes allow a highly granular ranking of the users based on their job related information.

In some implementations of the present technology, there is provided a method of determining an income of a user of a mobile device. The method is executable at a server and the mobile device is communicatively coupled to the server. The method comprises acquiring, by the server, device data associated with the user of the mobile device. The device data comprises information indicative of at least one occupation of the user. The method comprises associating, by the server, the user with a first occupational class amongst a plurality of occupational classes based on the information indicative of the at least one occupation of the user. The first occupational class is associated with at least one event type and a first MLA. The method comprises extracting, by the server, a first dataset from the device data based on the first occupational class, the first dataset which comprises data of a first plurality of data types. The method comprises applying, by the server, a first logical analysis of the first MLA to the first dataset. The first MLA has been trained to apply the first logical analysis to data of the first plurality of data types. The applying the first logical analysis comprises extracting, by the first MLA, from the first dataset a first data pattern which is indicative of a first occupational event performed by the user. The first data pattern is associated with one of the at least one event types. The applying the first logical analysis comprises determining, by the first MLA, a first income value associated with the first occupational event based on the first data pattern. The first income value is representative of an income of the user of the mobile device.

In some embodiments of the method, the first plurality of data types comprises GPS data and temporal data.

In some embodiments of the method, the applying the first logical analysis further comprises extracting, by the first MLA, from the first dataset a second data pattern which is indicative of a second occupational event performed by the user. The second data pattern is associated with one of the at least one event types. The applying the first logical analysis further comprises determining, by the first MLA, a second income value associated with the second occupational event based on the second data pattern. The method further comprises determining, by the server, a total income value based on the first income value and the second income value. The total income value is representative of the income of the user of the mobile device.

In some embodiments of the method, the at least one event types comprises more than one event types. The first data pattern and the second data pattern are respectively associated with distinct event types amongst the more than one event types.

In some embodiments of the method, the associating comprises associating, by the server, the user with a second occupational class amongst the plurality of occupational classes based on the information indicative of the at least one occupation of the user. The second occupational class is associated with at least one other event type and a second MLA. The method further comprises extracting, by the server, a second dataset from the device data based on the second occupational class where the second dataset comprises data of a second plurality of data types. The method further comprises applying, by the server, a second logical analysis of the second MLA to the second dataset. The second MLA has been trained to apply the second logical analysis to data of the second plurality of data types. The applying the second logical analysis comprises extracting, by the second MLA, from the second dataset a second data pattern which is indicative of a second occupational event performed by the user. The second data pattern is associated with one of the at least one other event types. The applying the second logical analysis comprises determining, by the second MLA, a second income value associated with the second occupational event based on the second data pattern. The method further comprises determining, by the server, a total income value based on the first income value and the second income value. The total income value is representative of the income of the user of the mobile device.

In some embodiments of the method, the second plurality of data types comprises sound data and temporal data.

In some embodiments of the method, the at least one event type and the at least one other event type are distinct event types.

In some embodiments of the method, the first occupational class is one of:
  a taxi driver class;
  a delivery driver class;
  a painter class;
  a construction worker class; and
  a waiter class.

In some embodiments of the method, the method further comprises acquiring, by the server, a second device data associated with a second user of a second mobile device which is communicatively coupled to the server. The second device data comprises information which is indicative of at least one occupation of the second user. The method further comprises associating, by the server, the second user with a second occupational class amongst the plurality of occupational classes based on the information which is indicative of the at least one occupation of the second user. The second occupational class is associated with at least one other event type and a second MLA. The method further comprises extracting, by the server, a second dataset from the second device data based on the second occupational class. The second dataset comprises data of a second plurality of data types. The method further comprises applying, by the server, a second logical analysis of the second MLA to the first dataset. The second MLA has been trained to apply the second logical analysis to data of the second plurality of data types. The applying the second logical analysis comprises extracting, by the second MLA, from the second dataset a second data pattern which is indicative of a second occupational event performed by the second user. The second data pattern is associated with one of the at least one other event types. The applying the second logical analysis comprises determining, by the second MLA, a second income value associated with the second occupational event based on the second data pattern. The second income value is representative of an income of the second user of the second mobile device. The method further comprises ranking, by the server, the user and the second user relative to each other based on the first outcome value and the second outcome value.

In some embodiments of the method, the first occupational class and the second occupational class are a same occupational class.

In some implementations of the present technology, there is provided a server for determining an income of a user of a mobile device. The mobile device is communicatively coupled to the server and the server is configured to acquire device data associated with the user of the mobile device. The device data comprises information which is indicative of at least one occupation of the user. The server is configured to associate the user with a first occupational class amongst a plurality of occupational classes based on the information which is indicative of the at least one occupation of the user. The first occupational class is associated with at least one event type and a first MLA. The server is configured to extract a first dataset from the device data based on the first occupational class. The first dataset comprises data of a first plurality of data types. The server is configured to apply a first logical analysis of the first MLA to the first dataset. The first MLA has been trained to apply the first logical analysis to data of the first plurality of data types. In order to apply the first logical analysis the server is configured to extract, by the first MLA, from the first dataset a first data pattern which is indicative of a first occupational event performed by the user. The first data pattern is associated with one of the at least one event types. In order to apply the first logical analysis the server is configured to determine, by the first MLA, a first income value associated with the first occupational event based on the first data pattern. The first income value is representative of an income of the user of the mobile device.

In some embodiments of the server, the first plurality of data types comprises GPS data and temporal data.

In some embodiments of the server, in order to apply the first logical analysis, the server is further configured to extract, by the first MLA, from the first dataset a second data pattern which is indicative of a second occupational event performed by the user. The second data pattern is associated with one of the at least one event types. In order to apply the first logical analysis, the server is further configured to determine, by the first MLA, a second income value associated with the second occupational event based on the second data pattern. The server is further configured to determine a total income value based on the first income value and the second income value. The total income value is representative of the income of the user of the mobile device.

In some embodiments of the server, the at least one event types comprises more than one event types. The first data pattern and the second data pattern are respectively associated with distinct event types amongst the more than one event types.

In some embodiments of the server, the server is configured to associate further comprises the server configured to associate the user with a second occupational class amongst the plurality of occupational classes based on the information which is indicative of the at least one occupation of the user. The second occupational class is associated with at least one other event type and a second MLA. The server is further configured to extract a second dataset from the device data based on the second occupational class. The second dataset comprises data of a second plurality of data types. The server is further configured to apply a second logical analysis of the second MLA to the second dataset. The second MLA has been trained to apply the second logical analysis to data of the second plurality of data types. In order to apply the second logical analysis, the server is configured to extract, by the second MLA, from the second dataset a second data pattern which is indicative of a second occupational event performed by the user. The second data pattern is associated with one of the at least one other event types. In order to apply the second logical analysis, the server is configured to determine, by the second MLA, a second income value associated with the second occupational event based on the second data pattern. The server is further configured to determine a total income value based on the first income value and the second income value. The total income value is representative of the income of the user of the mobile device.

In some embodiments of the server, the second plurality of data types comprises sound data and temporal data.

In some embodiments of the server, the at least one event type and the at least one other event type are distinct event types.

In some embodiments of the server, the first occupational class is one of:
  a taxi driver class;
  a delivery driver class;
  a painter class;
  a construction worker class; and
  a waiter class.

In some embodiments of the server, the server is further configured to acquire a second device data associated with a second user of a second mobile device which is communicatively coupled to the server. The second device data comprises information which is indicative of at least one occupation of the second user. The server is further configured to associate the second user with a second occupational class amongst the plurality of occupational classes based on the information which is indicative of the at least one occupation of the second user. The second occupational class is associated with at least one other event type and a second MLA. The server is further configured to extract a second dataset from the second device data based on the second occupational class. The second dataset comprises data of a second plurality of data types. The server is further configured to apply a second logical analysis of the second MLA to the first dataset. The second MLA has been trained to apply the second logical analysis to data of the second plurality of data types. In order to apply the second logical analysis, the server is configured to extract, by the second MLA, from the second dataset a second data pattern which is indicative of a second occupational event performed by the second user. The second data pattern is associated with one of the at least one other event types. In order to apply the second logical analysis, the server is configured to determine, by the second MLA, a second income value associated with the second occupational event based on the second data pattern. The second income value is representative of an income of the second user of the second mobile device. The server is further configured to rank the user and the second user relative to each other based on the first outcome value and the second outcome value.

In some embodiments of the server, the first occupational class and the second occupational class are a same occupational class.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 7 is a schematic representation of a method of determining an income of a user of a mobile device which is performed by the server depicted in FIG. 1 as envisioned in some implementations of the present technology.

DETAILED DESCRIPTION

Figure 1:
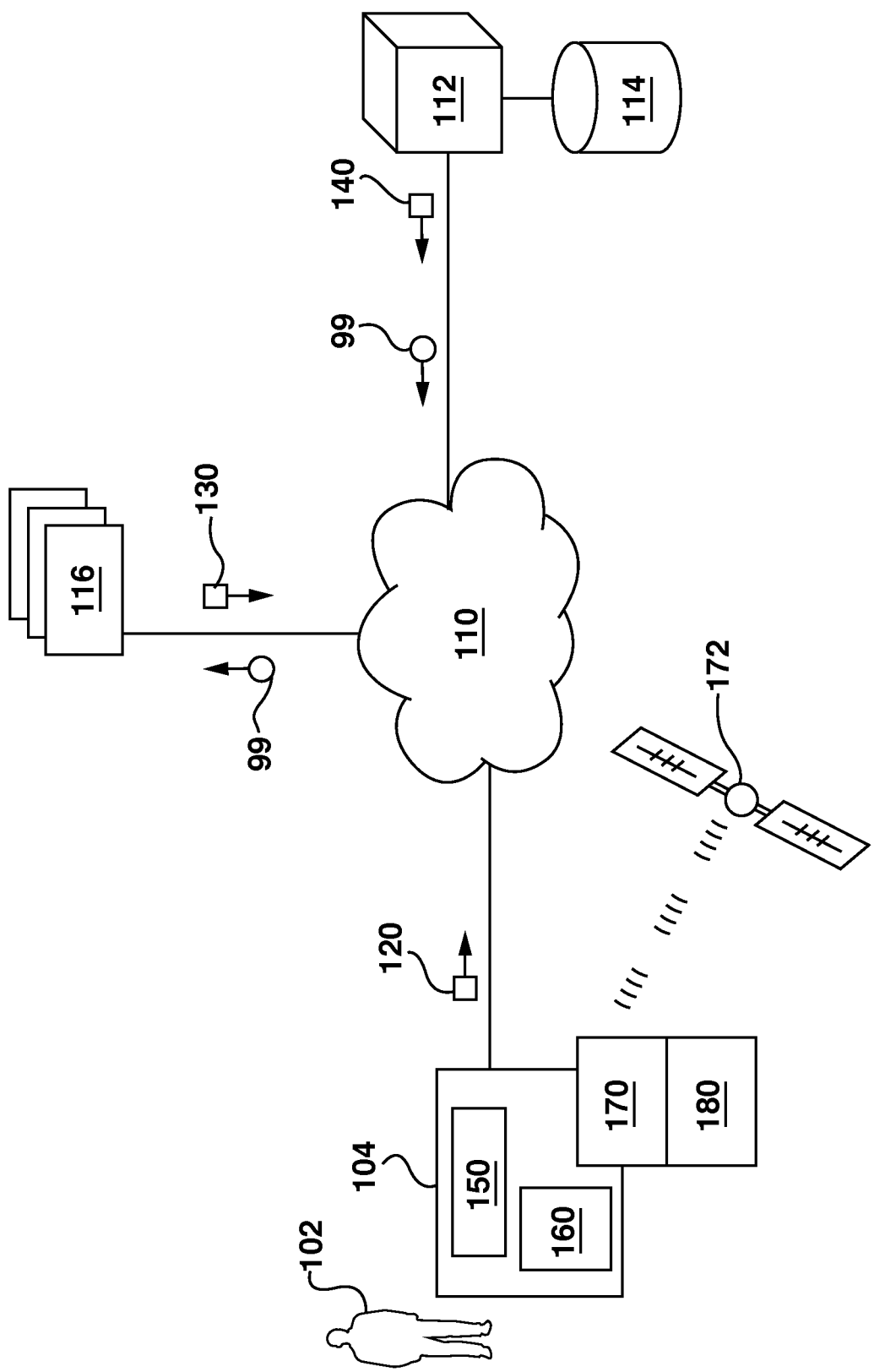
FIG. 1 is a schematic diagram of a system for determining an income of a user of a mobile device as contemplated in some embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Description of Mobile Device

Generally speaking, the system 100 is configured to determine an income of a user 102 of the system 100. More specifically, a server 112 may be configured to determine the income of the user 102 who is associated with a mobile device 104.

As such, the mobile device 104 can sometimes be referred to as a "client device", "end user device", "electronic device" or "client electronic device". The implementation of the mobile device 104 is not particularly limited, but as an example, the mobile device 104 may be implemented as a wireless communication device (such as a smartphone, a cell phone, a tablet and the like). The mobile device 104 comprises hardware and/or software and/or firmware (or a combination thereof), as is known in the art, to execute a plurality of applications 150.

Additionally, the mobile device 104 comprises a GPS module 170. The GPS module 170 is configured to receive GPS signals that are transmitted thereto by a GPS satellite 172. Therefore, the mobile device 104 may be configured to record geographical positions of the GPS module 170. A given geographical position may be representative of a given longitude, a given latitude and a given altitude of the GPS module 170. In some embodiments, the given geographical position may also be associated with a given timestamp being representative of a time when the given geographical position has been recorded by the mobile device 104 (i.e., or by the GPS module 170).

The mobile device 104 comprises sensor devices 180 which include one or more sensor devices to provide additional input and facilitate multiple functionalities of the mobile device 104. Some examples of implementations of the sensor devices 180 can include one or more of:

a microphone,
an accelerometer,
an ambient temperature measurement device,
a device for measuring the force of gravity,
a gyroscope,
a device for measuring ambient light,
a device for measuring acceleration force,
a device for measuring ambient geomagnetic field,
a device for measuring a degree of rotation,
a device for measuring ambient air pressure,
a device for measuring relative ambient humidity,
a device for measuring device orientation,
a device for measuring temperature of the device,
etc.

It is noted that some of these sensor devices 180 can be implemented in hardware, software or a combination of the two.

Figure 2:
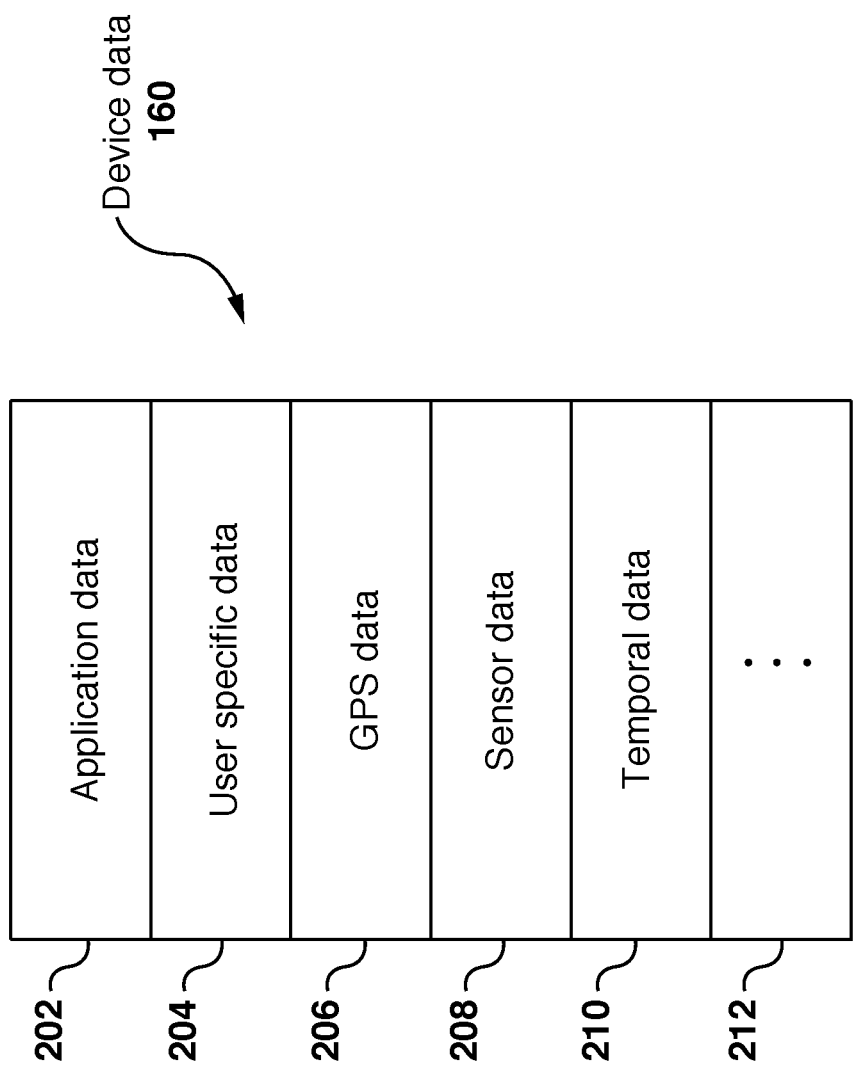
FIG. 2 depicts the content of the device data of the mobile device depicted in FIG. 1.

The mobile device 104 may comprise a device storage (not depicted) for storing device data 160. The device data 160 and various data types comprised therein will further be explained below with reference to FIG. 2. In FIG. 2, there is depicted the device data 160 which comprises: application data 202, user specific data 204, GPS data 206, sensor data 208, temporal data 210 and other data 212. The application data 202 is data provided by the plurality of applications 150 with respect to user interactions of the user 102 with the plurality of applications 150.

In additional embodiments of the present technology, the application data 202 may comprise miscellaneous information determined and/or extracted by the plurality of applications 150 about the user 102. As a non-exhaustive list of examples of the miscellaneous information about the user 102, the miscellaneous information may comprise user preferences, user habits, statistical data, login information, etc.

The user specific data 204 may be data explicitly provided by the user 102 by the mobile device 104. For example, the user specific data 204 may be indicative of user preferences, settings, user activity or other information that the user 102 inputted, selected, or was desirous to store on the mobile device 104.

The GPS data 206 is data provided by the GPS module 170 and comprises information indicative of a plurality of given geographical positions of the mobile device 104 having been recorded. Similarly to the GPS data 206, the sensor data 208 is data provided by the one or more sensors of the sensor devices 180 and comprises information indicative of values of one or more sensed parameters by the respective one or more sensors of the sensor devices 180 having been recorded.

The temporal data 210 is representative of timestamps associated with the application data 202, the user specific data 204, the GPS data 206, the sensor data 208 and the other data 212. In other words, the temporal data 210 may be indicative of an exact time or of an interval of time during which a given data has been recorded and/or provided to the mobile device 104.

In FIG. 2, temporal data 210 is depicted as a separate entity from the application data 202, the user specific data 204, the GPS data 206, the sensor data 208 and the other data 212. However, in some embodiments of the present technology, the temporal data 210 may be implicitly included in the application data 202, the user specific data 204, the GPS data 206, the sensor data 208 and the other data 212. In additional embodiments, the mobile device 104 may be configured to analyse the application data 202, the user specific data 204, the GPS data 206, the sensor data 208 and the other data 212 in order to determine and extract the temporal data 210. This way, the temporal data 210 may be stored explicitly in the device storage of the mobile device 102.

The other data 212 may be indicative of additional information related with the multiple functionalities of the mobile device 104 and is depicted in FIG. 2 in order to clarify that the device data 160 may comprise other data types of data to those having been presented above.

Generally speaking, the mobile device 104 is configured to (i) track user interactions with the mobile device 104, (ii) gather and store device data 160 and (iii) transmit the device data 160 by a communication network 110. The mobile device 104 may be configured to generate a device data packet 120 (FIG. 1). The device data packet 120 comprises the device data 160 (or a portion thereof) and may be transmitted via the communication network 110 to at least one other device communicatively connected thereto for execution of additional tasks based on the device data 160 and/or for external storage thereof.

Continuing with the description of FIG. 1, the mobile device 104 is communicatively coupled to the communication network 110 for accessing a server 112. In some non-limiting embodiments of the present technology, the communication network 110 can be implemented as the Internet. In other embodiments of the present technology, the communication network 110 can be implemented differently, such as any wide-area communication network, local-area communication network, a private communication network and the like. A communication link (not separately numbered) between the mobile device 104 and the communication network 110 is implemented will depend inter alia on how the mobile device 104 is implemented.

Description of External Services

In some embodiments, the system 100 comprises external services 116 which are communicatively coupled to the communication network 110. The external services 116 host one or more web services that provide requested data about users subscribed thereto (i.e., subscribers). For example, the one or more web services may comprise: Yandex.Taxi™, Google.Maps™, Yandex.Maps™, Yandex.Mail™, Uber™, Yandex.Search™, Yandex.Money™, Gmail™, Yandex.Metrics™, Yandex.Disk™, etc. Additionally, the one ore more web services may comprise work management web services for a variety of professions. For instance, the work management web services may comprise: construction management web services, delivery web services, watering web services, etc. It should be noted that the preceding list of the one or more web services is not exhaustive and a large number and a large variety of web services may be hosted by the external services 116.

How the external services 116 are implemented is generally known in the art and as such, will not be described here at much length. Suffice to say that upon request, for example, the external services 116 provide the requested data to the server 112. Generally speaking, the requested data provided to the server 112 is employed by the server 112 in order to execute at least some functionalities of the server 112, such as training a plurality of Machine Learning Algorithms (MLAs) 350, depicted in FIG. 3, and, in some embodiments, to determine characteristics attributed to respective subscribers of the one or more web services.

Figure 4:
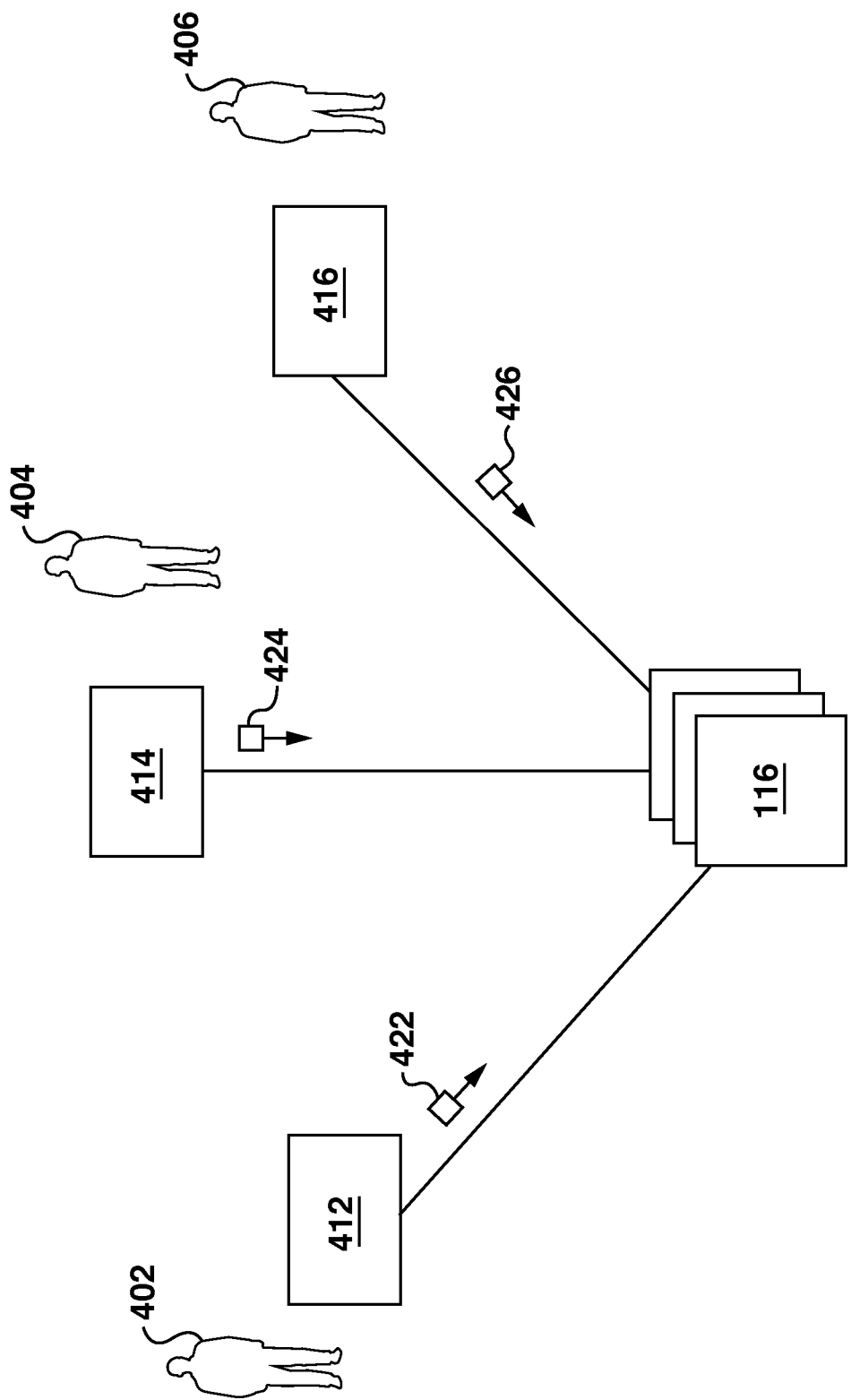
FIG. 4 depicts subscribers to one or more web services hosted by the external services depicted in FIG. 1 as contemplated in some embodiments of the present technology.

In order to understand the content of the requested data acquired and stored by the external services 116 will now be described with reference to FIG. 4. FIG. 4 depicts a first subscriber 402, a second subscriber 404 and a third subscriber 406, who are subscribers to a specific web service hosted by the external services 116. In other embodiments, the first subscriber 402, the second subscriber 404 and the third subscriber 406 may be associated with respective web services hosted by the external services 116.

Each one of the first subscriber 402, the second subscriber 404 and the third subscriber 406 is respectively associated with a first subscriber device 412, a second subscriber device 414 and a third subscriber device 416. Each one of the first subscriber device 412, the second subscriber device 414 and the third subscriber device 416 is implemented similarly to the mobile device 104 of the user 102 depicted in FIG. 1. In other embodiments, however, each one of the first subscriber device 412, the second subscriber device 414 and the third subscriber device 416 may be implemented differently from the mobile device 104.

Each one of the first subscriber device 412, the second subscriber device 414 and the third subscriber device 416 may generate, respectively, a first subscriber data packet 422, a second subscriber data packet 424 and a third subscriber data packet 426. Each one of the first subscriber data packet 422, the second subscriber data packet 424 and the third subscriber data packet 426 comprises subscriber device data respectively associated with the first subscriber device 412, the second subscriber device 414 and the third subscriber device 416. The subscriber device data of each one of the first subscriber device 412, the second subscriber device 414 and the third subscriber device 416 may comprise various data types similarly to the device data 160 depicted in FIG. 2. The first subscriber data packet 422, the second subscriber data packet 424 and the third subscriber data packet 426 are generated in order to transmit the subscriber device data of each one of the first subscriber device 412, the second subscriber device 414 and the third subscriber device 416 to the external services 116.

As a mere example, let's have a closer look at the subscriber device data of the first subscriber device 412. For instance, the first subscriber 402 may be a particular taxi driver subscribed to a given web service, such as Yandex.Taxi web service. This means that the first subscriber 402 is working for Yandex.Taxi web services as the particular taxi driver. The first subscriber device 412 implements a given taxi application associated with the Yandex.Taxi web service which allows tracking and gathering information about the first subscriber 402.

The given taxi application may track and gather information about the first subscriber 402 such as GPS data associated with taxi rides offered by the first subscriber 402, fare data (i.e., fare prices or fare rates having been charged by the particular taxi driver) related to taxi rides offered by the first subscriber 402, temporal data associated with the taxi rides offered by the first subscriber 402, etc. Additionally, the given taxi application may track and gather checkpoint data associated with the taxi rides offered by the first subscriber 402. In other words, the checkpoint data may be indicative of a starting checkpoint and an ending checkpoint of each taxi ride offered by the first subscriber 402.

It should be noted that the information tracked and gathered by the given taxi application may be included in the subscriber device data of the first subscriber device 412. The information tracked and gathered by the given taxi application will be further discussed below with reference to FIG. 5 and to at least some functionalities of the server 112.

As another example, let's have a closer look at the subscriber device data of the second subscriber device 414. For instance, the second subscriber 404 may be a particular construction worker subscribed to a construction management web service. This means that the second subscriber 404 is working as the particular construction worker for a construction enterprise implementing the construction management web service. The second subscriber device 414 implements a given construction managing application which allows tracking and gathering information about construction jobs undertaken by the second subscriber 404.

The given construction management application may track and gather information about the second subscriber 404 such as geographical information associated with construction jobs undertaken by the second subscriber 404, indications of types of the construction jobs undertaken by the second subscriber 404, temporal data associated with the construction jobs undertaken by the second subscriber 404, time rate data (i.e., time rates for charging an amount of money per unit of time for a given construction job) associated with the construction jobs undertaken by the second subscriber 404, etc. Additionally, the given construction management application may track and gather sound data (via a sensor device such as a microphone of the second subscriber device 414) associated with the construction jobs undertaken by the second subscriber 404. In addition, the given construction management application may track and gather checkpoint data associated with the construction jobs undertaken by the second subscriber 404. In other words, the checkpoint data may be indicative of a starting checkpoint and an ending checkpoint of each construction job undertaken by the second subscriber 404.

It should be noted that the information tracked and gathered by the given construction management application may be included in the subscriber device data of the second subscriber device 414. The information tracked and gathered by the given construction managing application will be further discussed below with reference to FIG. 6 and to at least some functionalities of the server 112.

As previously mentioned, with reference to FIG. 1, the server 112 may request the requested data from the external services 116. As a result, the server 112 is configured to generate a request packet 99 which comprises computer-readable instructions for enabling the external services 116 to identify the requested data. The server 112 may then transmit the request packet 99 to the external services 116 for identifying the requested data by the server 112. The computer-readable instructions may be generated by an operator (not depicted) of the server 112.

Upon acquiring the request packet 99 from the server 112 via the communication network 110, the external services 116 are configured to generate a requested data packet 130 in order to transmit the requested data to the server 112. For example, the requested data may comprise the subscriber device data of each one of the first subscriber device 412, the second subscriber device 414 and the third subscriber device 416. In other embodiments, however, the requested data may comprise at least some of the subscriber device data of each one of the first subscriber device 412, the second subscriber device 414 and the third subscriber device 416 and will depend on the computer-readable instructions that have been transmitted to the external services 116 via the request packet 99.

Description of the Server

With continued reference to FIG. 1, the server 112 can be implemented as a conventional computer server. In an example of an embodiment of the present technology, the server 112 can be implemented as a Dell™ PowerEdge™ Server running the Microsoft™ Windows Server™ operating system. Needless to say, the server 112 can be implemented in any other suitable hardware, software, and/or firmware, or a combination thereof. In the depicted non-limiting embodiments of the present technology, the server 112 is a single server. In alternative non-limiting embodiments of the present technology, the functionality of the server 112 may be distributed and may be implemented via multiple servers.

Generally speaking, the server 112 is configured to execute a plurality of computer-executable routines in order to facilitate at least some functionalities of the present technology. The server 112 is configured to: (i) acquire the device data 160 from mobile device 104 associated with the user 102, (ii) associate the user 102 to at least one class of users, (iii) extract a dataset from the device data 160 which comprises data of a specific plurality of data types, (iv) train the plurality of MLAs 350 depicted in FIG. 3, (v) apply a given logical analysis on the dataset based on one of the trained MLAs 350, (vi) extract at least one data pattern indicative of an at least one occupational event performed by the user 102 and (vii) determine at least one income value respectively associated with each one of the at least one occupational event performed by the user 102.

How the server 112 is configured to execute the plurality of computer-executable routines mentioned above will be further described below with reference to additional functionalities of the server 112 and to multiple implementational details of the present technology.

As depicted in FIG. 1, the server 112 is in communicatively coupled to a server storage 114. The server storage 114 is depicted in FIG. 1 as a singly entity but this does not need to be so in each and every embodiment of the present technology. As such, the server storage 114 may, in itself, be split into several distributed storages. Alternatively, the server storage 114 can be implemented as part of the server 112.

Figure 3:
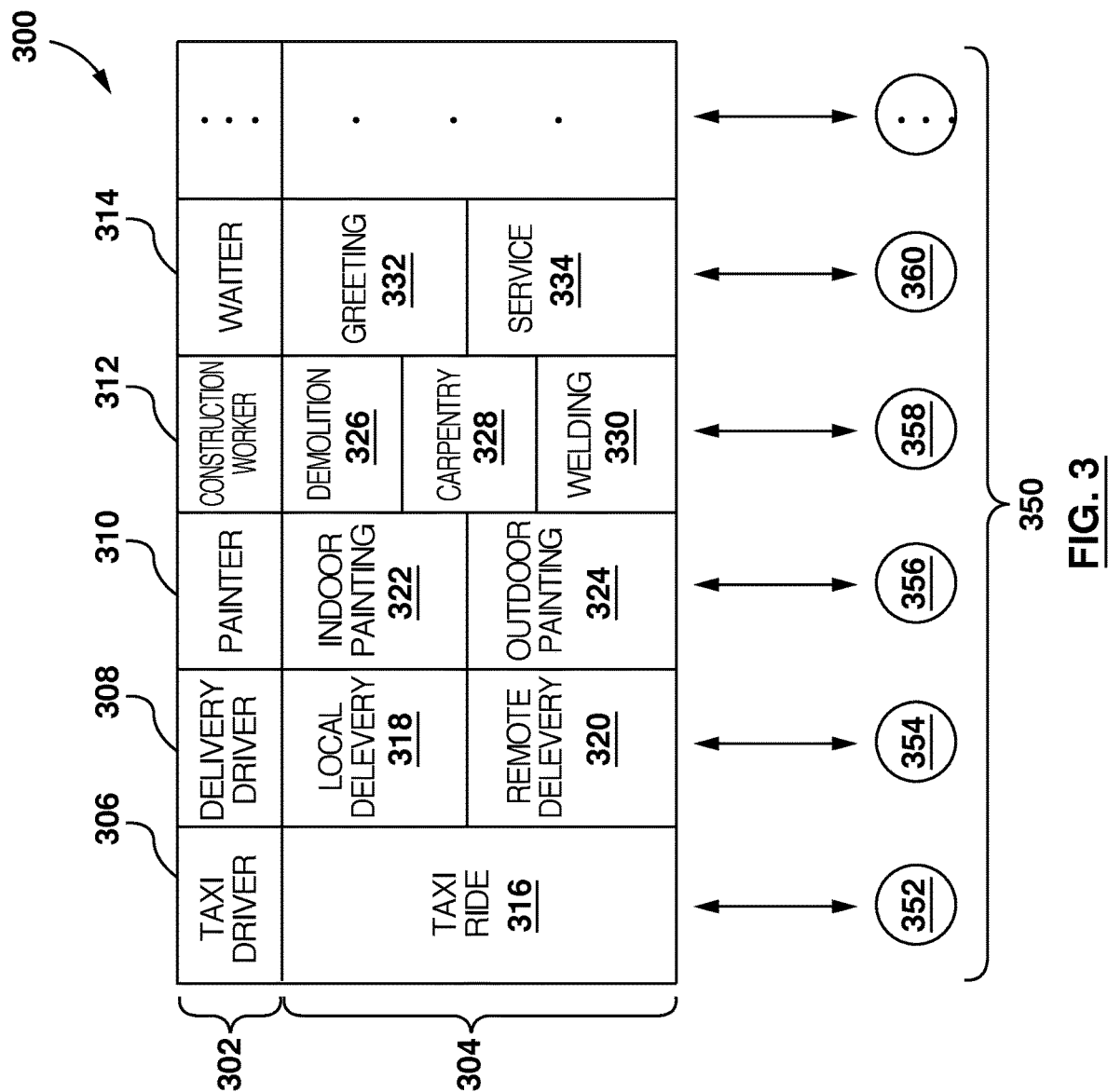
FIG. 3 depicts a occupational data table and a plurality of machine learning algorithms that are stored in the server storage depicted in FIG. 1.

With reference to FIG. 3, there is depicted an occupational data table 300 and the plurality of MLAs 350. The occupational data table 300 and the plurality of MLAs 350 are stored locally by the server storage 114. In other embodiments, the occupational data table 300 and the plurality of MLAs 350 may be stored remotely on any storage device communicatively coupled, directly or indirectly, to the server 112.

Description of the Occupational Data Table

The occupational data table 300 is created and structured by the operator of the server 112. The occupational data table 300 comprises a plurality of occupational classes 302. In the depicted example, the plurality of occupational classes 302 comprises five distinct occupational classes, namely: a taxi driver class 306, a delivery driver class 308, a painter class 310, a construction worker class 312, and a waiter class 314.

As mentioned above, each occupational class in the plurality of occupational classes 302 is defined by the operator of the server 112. Needles to say, the plurality of occupational classes 302 may comprise a smaller or a larger number of distinct occupational classes, which will depend on various implementations of the present technology. Therefore, it should be noted that the plurality of occupational classes 302 comprising the five distinct occupational classes is illustrated in FIG. 3 for ease of understanding only and may comprise more or less than the five distinct occupational classes.

The occupational data table 300 also comprises a plurality of event types 304. A first event type 316 "Taxi ride" is associated with the taxi driver class 306. A second event type 318 "Local delivery" and a third event type 320 "Remote delivery" are associated with the delivery driver class 308. A fourth event type 322 "Indoor painting" and a fifth event type 324 "Outdoor painting" are associated with the painter class 310. A sixth event type 326 "Demolition", a seventh event type 328 "Carpentry" and an eighth event type 330 "Welding" are associated with the construction worker class 312. A ninth event type 332 "Greeting" and a tenth event type "Service" are associated with the waiter class 314.

It should be noted that the plurality of event types 304 may comprise additional event types to those depicted in FIG. 2. Associations between the plurality of occupational classes 302 and the plurality of event types 304 are determined by the operator of the server 112. As such, associations between the plurality of occupational classes 302 and the plurality of event type 304 are illustrated in FIG. 3 for ease of understanding only and that a large variety of associations between the plurality of occupational classes 302 and the plurality of event types 304 may be implemented in additional embodiments of the present technology.

Each occupational class amongst the plurality of occupational classes 302 is associated with a respective MLA amongst the plurality of MLAs 350. More specifically, the taxi driver class 306 is associated with a first MLA 352, the delivery driver class 308 is associated with a second MLA 354, the painter class 310 is associated with a third MLA 356, the construction worker class 312 is associated with a fourth MLA 358 and the waiter class 314 is associated with a fifth MLA 360. Implementational details and at least some functionalities of the plurality of MLAs 350 will now be described.

Description of the MLAs

Generally speaking, a given MLA that is associated with a given occupational class amongst the plurality of occupational classes 302 applies a respective logical analysis on a dataset inputted therein. The application of a respective logical analysis is effected in order to determine at least one given occupational event from the dataset. Also, the application of a respective logical analysis results in an association of the at least one given occupational event with a given event type that is associated with the given occupational class of the given MLA during an in-use phase of the given MLA.

For instance, the first MLA 352 that is associated with the taxi driver class 306 may apply a respective logical analysis on the dataset inputted therein. The application of the logical analysis of the first MLA 352 may be effected in order to determine the at least one given occupational event from the dataset. The application of the respective logical analysis will also result in an association of the at least one given occupational event with the first event type 316 "Taxi ride".

In another instance, the fourth MLA 358 that is associated with the construction worker class 312 may apply a respective logical analysis on the dataset inputted therein. The application of the logical analysis of the fourth MLA 358 may be effected in order to determine the at least one given occupational event from the dataset. The application of the respective logical analysis will also result in an association of the at least one given occupational event with either the sixth event type 326 "Demolition", seventh event type 328 "Carpentry" or the eighth event type 330 "Welding".

However, in order to apply the respective logical analysis on the dataset, each given MLA amongst the plurality of MLAs 350 must be trained based on the requested data acquired by the server 112 from the external services 116. How a given MLA is trained in order to apply a respective logical analysis will now be described.

The server 112 is configured to train each MLA in the plurality of MLAs 350 based on the requested data that was transmitted to the server 112 from the external services 116. The server 112 is configured to execute a preliminary analysis upon acquiring the requested data packet 130 depicted in FIG. 1. As mentioned above, the requested data packet 130 comprises subscriber device data of the subscriber devices associated with the one or more web services hosted by the external services 116. The preliminary analysis is executed via a set of computer-readable instructions that are stored in the server storage 114.

Generally speaking, the server 112 is configured to execute the preliminary analysis in order to structure the requested data for training the plurality of MLAs 350 based on that structured data. In other words, the preliminary analysis is executed by the server 112 in order to structure raw data (i.e., subscriber device data) into training data for training the plurality of MLAs 350.

Needless to say, each MLA amongst the plurality of MLAs 350 may be associated with a distinct preliminary analysis where each distinct preliminary analysis will vary depending on the occupational class to which each MLA is associated. This means that the server 112 may be configured to execute a distinct preliminary analysis for each MLA amongst the plurality of MLAs 350.

Further implementational details of the preliminary analyses and MLA trainings will be described with respect to the first MLA 352 and the fourth MLA 358. For ease of understanding, let's assume that the first subscriber 402 is the particular taxi driver subscribed to the Yandex.Taxi web service and that the second subscriber 404 is the particular construction worker subscribed to the construction management web service.

Execution of a 1$^{st}$ Preliminary Analysis

As part of a first preliminary analysis associated with the first MLA 352, the server 112 may be configured to determine subscriber device data that is required for training the first MLA 352. In this case, the server 112 may identify at least some of the subscriber device data of the first subscriber device 412 as training data of the first MLA 352. Indeed, the subscriber device data of the first subscriber device 412 is indicative of the first subscriber 402 being the particular taxi driver. Therefore, since the first MLA 352 is associated with the taxi driver class 306, the server 112 may determine that at least some of the subscriber device data of the first subscriber device 412 is to be used for training data of the first MLA 352.

Figure 5:
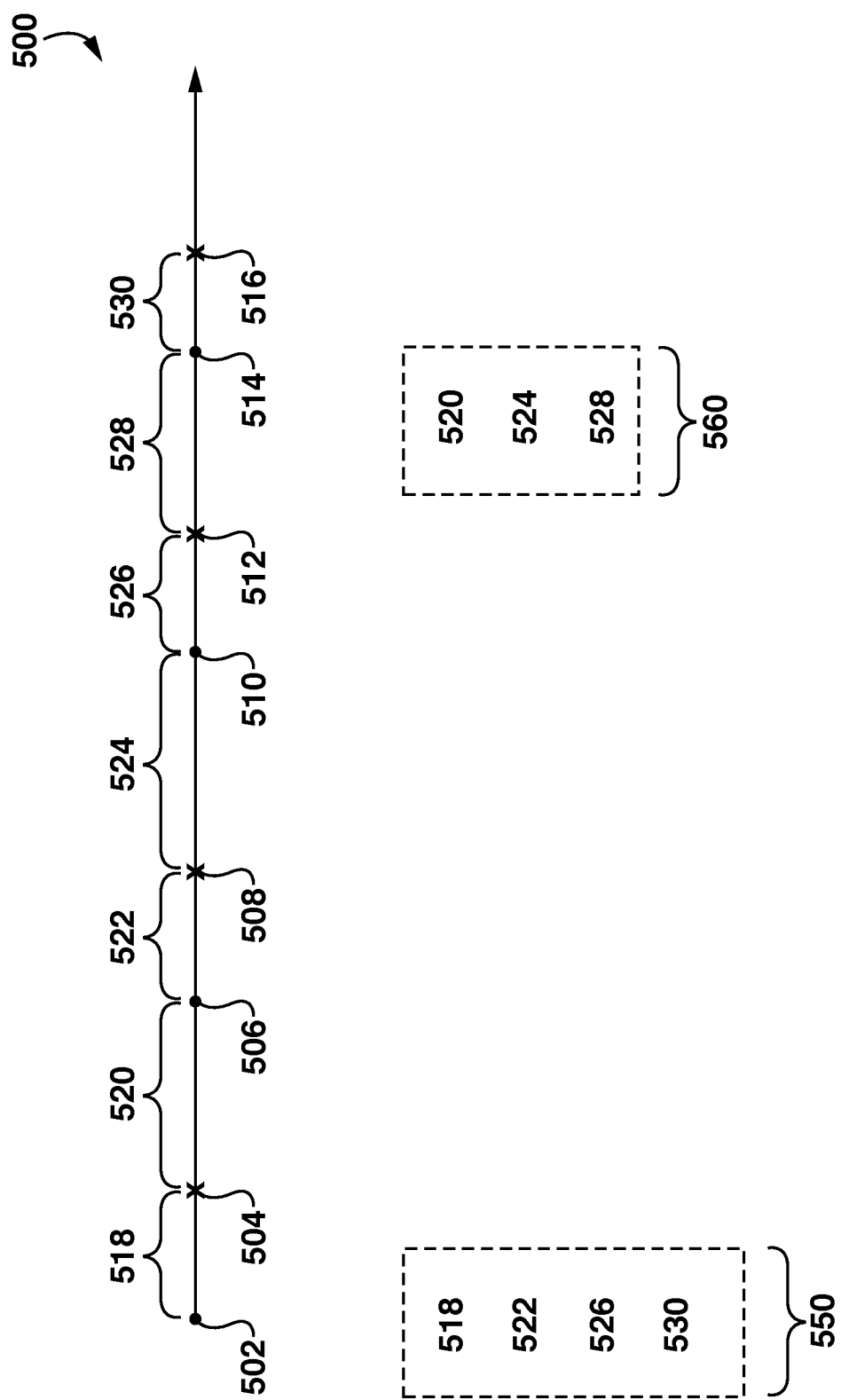
FIG. 5 is a visual representation of the GPS data in time associated with the first subscriber device depicted in FIG. 4.

With reference to FIG. 5, there is depicted a visual representation 500 of the GPS data in time associated with the first subscriber device 412. The visual representation 500 comprises a first starting checkpoint 502, a second starting checkpoint 506, a third starting checkpoint 510 and a fourth starting checkpoint 514 which are all part of the checkpoint data associated with the taxi rides offered by the first subscriber 402. The visual representation 500 also comprises a first ending checkpoint 504, a second ending checkpoint 508, a third ending checkpoint 512 and a fourth ending checkpoint 516 which are all part of the checkpoint data associated with the taxi rides offered by the first subscriber 402. As previously mentioned, the checkpoint data is transmitted to the server 112 via the requested data packet 130.

The server 112 may execute the first preliminary analysis in order to sort the subscriber device data of the first subscriber device 412 based on the checkpoint data.

In some embodiments, the server 112 may sort the subscriber device data of the first subscriber device 412 into a first data segment 550 associated with the taxi rides offered by the particular taxi driver. For example, the server 112 is configured to associate a first taxi ride data 518 to the first data segment 550 since the first taxi ride data 518 is a portion of the GPS data gathered during an interval of time delimited by the first starting checkpoint 502 and the first ending checkpoint 504. For ease of understating, the first taxi ride data 518 comprises GPS data associated with a first taxi ride offered by the particular taxi driver.

Similarly, the server 112 may be configured to associate a second taxi ride data 522, a third taxi ride data 526 and a fourth taxi ride data 530 to the first data segment 550. For example:
  the second taxi ride data 522 is a portion of the GPS data gathered during an interval of time delimited by the second starting checkpoint 506 and the second ending checkpoint 508;
  the third taxi ride data 526 is a portion of the GPS data gathered during an interval of time delimited by the third starting checkpoint 510 and the third ending checkpoint 512; and
  the fourth taxi ride data 530 is a portion of the GPS data gathered during an interval of time delimited by the fourth starting checkpoint 514 and the fourth ending checkpoint 516.

In other embodiments, the server 112 may sort the subscriber device data of the first subscriber device 412 into the first data segment 550 and into a second data segment 560 where the latter one is associated with time intervals which are between two consecutive taxi rides offered by the particular taxi driver. Such time intervals are representative of stand-by periods during which the particular taxi driver (i.e., the first subscriber 402) is waiting to pick-up a new customer in order to offer her/him a taxi ride. For example, the server 112 is configured to associate a first stand-by data 520 to the second data segment 560 since the first stand-by data 520 is a portion of the GPS data gathered during an interval of time delimited by the first ending checkpoint 504 and the second starting checkpoint 506.

Similarly, the server 112 may be configured to associate a second stand-by data 524 and a third stand-by data 528 to the second data segment 560. For example:
  the second stand-by data 524 is a portion of the GPS data gathered during an interval of time delimited by the second ending checkpoint 508 and the third starting checkpoint 510; and
  the third stand-by data 528 is a portion of the GPS data gathered during an interval of time delimited by the third ending checkpoint 512 and the fourth starting checkpoint 514.

As a result of the first preliminary analysis executed by the server 112, at least some of the subscriber device data of the first subscriber device 412 (i.e., raw data) is structured into the training data for training the first MLA 352. In this case, the training data for training the first MLA 352 comprises the first data segment 550, the second data segment 560 and the fare data associated with each taxi ride data in the first data segment 550. The server 112 is configured to store the training data for training the first MLA 352. In other embodiments, the server 112 may be configured to train the first MLA 352 upon terminating the first preliminary analysis.

Training of the 1$^{st}$ MLA

After executing the first preliminary analysis, the server 112 is configured to input the training data of the first MLA 352 into the first MLA 352. Based on the training data inputted into the first MLA 352, the first MLA 352 is trained to recognise data patterns that are indicative of taxi rides offered by the particular taxi driver. For example, the first MLA 352 may be trained to recognise data patterns in the first data segment 550. In other words, the first MLA 32 may be trained to recognise data patterns that are implicit in the GPS data associated with the first taxi ride data 518, the second taxi ride data 522, the third taxi ride data 526 and the fourth taxi ride data 530. Therefore, the first MLA 352 may be trained to recognise data patterns that are implicit in the GPS data and that are indicative of taxi rides having been offered.

Additionally, the first MLA 352 may be trained to attribute a fare price to each taxi ride having been offered. Indeed, since the fare information is part of the training data that is inputted into the first MLA 352, the first MLA 352 may be trained to estimate for each data pattern being indicative of a taxi ride having been offered a respective fare price based on the respective data pattern. The first MLA 352 may be trained to recognize associations between the fare prices charged by the particular taxi driver (i.e., the fare data comprises fare prices) and amounts of time in the time intervals associated with the respective data patterns. Additionally, the first MLA 352 may be trained to recognize associations between the fare prices charged by the particular taxi driver and geographical distances having been travelled by the particular taxi driver that are associated with the respective data patterns.

In other embodiments of the present technology, based on the training data inputted into the first MLA 352, the first MLA 352 may be trained to recognise data patterns that are indicative of stand-by periods of the particular taxi driver. For example, the first MLA 352 may be trained to recognise data patterns in the second data segment 560. In other words, the first MLA 352 may be trained to recognise data patterns that are implicit in the GPS data associated with the first stand-by data 520, the second stand-by data 524 and the third stand-by data 528. Therefore, the first MLA 352 may be trained to recognise data patterns that are implicit in the GPS data and that are indicative of stand-by periods during which the particular taxi driver was not offering taxi rides.

In some embodiments, recognition of the data patterns that are indicative of stand-by periods may allow the first MLA 352 to recognise more accurately the data patterns that are indicative of taxi rides having been offered.

The server 112 is configured to train the first MLA 352 in order to apply its respective logical analysis to a plurality of data types which, in this case, comprises a GPS data type and a temporal data type. An in-use phase of the first MLA 352 during which the first MLA 352 applies its respective logical analysis will be further described below with reference to the device data 160 being acquired by the server 112 via the device data packet 120 depicted in FIG. 1.

Execution of a 4$^{th}$ Preliminary Analysis

As part of a fourth preliminary analysis, the server 112 may be configured to determine subscriber device data that is required for training the fourth MLA 358. In this case, the server 112 may identify at least some of the subscriber device data of the second subscriber device 414 as training data of the fourth MLA 358. It should be noted that the subscriber device data of the second subscriber device 414 comprises information that is indicative of the second subscriber 404 being the particular construction worker. Therefore, since the fourth MLA 358 is associated with the construction worker class 312, the server 112 may determine that at least some of the subscriber device data of the second subscriber device 414 is to be used for training data of the fourth MLA 358

Figure 6:
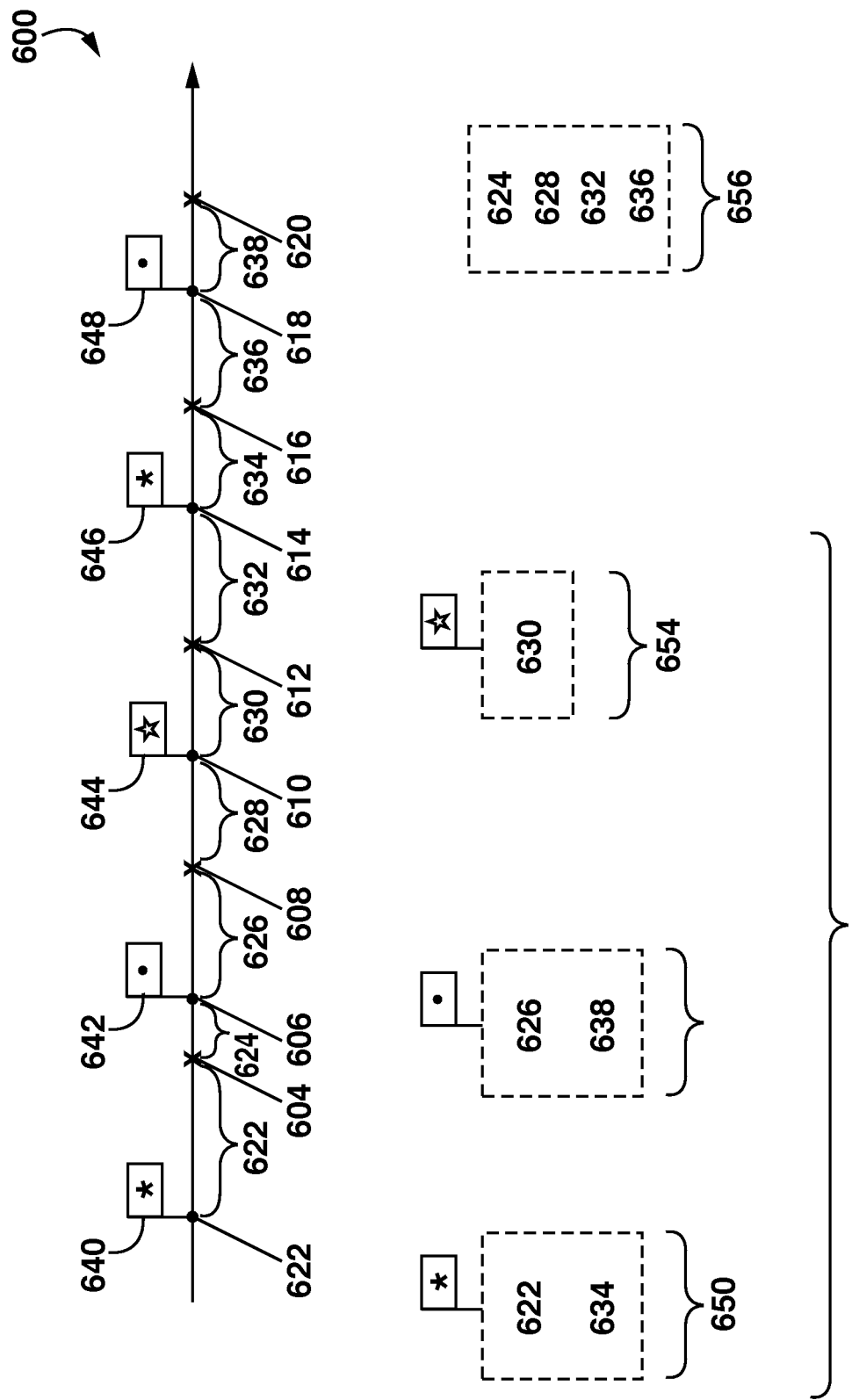
FIG. 6 is a visual representation of the sound data in time associated with the second subscriber device depicted in FIG. 4.

With reference to FIG. 6, there is depicted a visual representation 600 of the sound data in time associated with the second subscriber device 414. The visual representation 600 comprises a first starting checkpoint 602, a second starting checkpoint 606, a third starting checkpoint 610, a fourth starting checkpoint 614 and a fifth starting checkpoint 618 which are all part of the checkpoint data associated with the construction jobs undertaken by the second subscriber 404. The visual representation 600 also comprises a first ending checkpoint 604, a second ending checkpoint 608, a third ending checkpoint 612, a fourth ending checkpoint 616 and a fifth ending checkpoint 620 which are all part of the checkpoint data associated with the construction jobs undertaken by the second subscriber 404. The visual representation 600 also comprises a first indication 640, a second indication 642, a third indication 644, a fourth indication 646 and a fifth indication 648 which are all indications of types of construction jobs undertaken by the second subscriber 404 and which are all part of the subscriber device data of the second subscriber device 414. It should be noted that the checkpoint data and data associated with the indications of types of construction jobs are transmitted to the server 112 via the requested data packet 130.

The server 112 may execute the fourth preliminary analysis in order to sort the subscriber device data of the second subscriber device 414 based on the checkpoint data.

In some embodiments, the server 112 may sort the subscriber device data of the second subscriber device 414 into a first data segment 658 associated with the construction jobs undertaken by the second subscriber 404. For example, the server 112 is configured to associate a first construction job data 622 to the first data segment 658 since the first construction job data 622 is a portion of the sound data gathered during an interval of time delimited by the first starting checkpoint 602 and the first ending checkpoint 604. For ease of understating, the first construction job data 622 comprises sound data associated with a first construction job undertaken by the second subscriber 404.

Similarly, the server 112 may be configured to associate a second construction job data 626, a third construction job data 630, a fourth construction job data 634 and a fifth construction job data 638 to the first data segment 658. Indeed:

the second construction job data 626 is a portion of the sound data gathered during an interval of time delimited by the second starting checkpoint 606 and the second ending checkpoint 608;

the third construction job data 630 is a portion of the sound data gathered during an interval of time delimited by the third starting checkpoint 610 and the third ending checkpoint 612;

the fourth construction job data 634 is a portion of the sound data gathered during an interval of time delimited by the fourth starting checkpoint 614 and the fourth ending checkpoint 616; and the fifth construction job data 638 is a portion of the sound data gathered during an interval of time delimited by the fifth starting checkpoint 618 and the fifth ending checkpoint 620.

In other embodiments, the server 112 may execute the fourth preliminary analysis in order to sort the subscriber device data of the second subscriber device 414 further based on the indications of types of construction jobs.

For example, let's assume that the first indication 640 and the fourth indication 646 are indicative of the second subscriber 404 undertaking demolition jobs. Therefore, the server 112 may sort the first construction job data 622 and the fourth construction job data 634 into a first data sub-segment 650 in the first data segment 658 since the first indication 640 was gathered during a moment in time that is in the interval of time during which the first construction job data 622 was gathered and since the fourth indication 646 was gathered during a moment in time that is in the interval of time during which the fourth construction job data 634 was gathered.

In another example, let's assume that the second indication 642 and the fifth indication 648 are indicative of the second subscriber 404 undertaking carpentry jobs. Therefore, the server 112 may sort the second construction job data 626 and the fifth construction job data 638 into a second data sub-segment 652 in the first data segment 658 since the second indication 642 was gathered during a moment in time that is in the interval of time during which the second construction job data 626 was gathered and since the fifth indication 648 was gathered during a moment in time that is in the interval of time during which the fifth construction job data 638 was gathered.

In yet a further example, let's say that the third indication 644 is indicative of the second subscriber 404 undertaking a welding job. Therefore, the server 112 may sort the third construction job data 630 into a third data sub-segment 654 in the first data segment 658 since the third indication 644 was gathered during a moment in time that is in the interval of time during which the third construction job data 630 was gathered.

In additional embodiments, the server 112 may sort the subscriber device data of the second subscriber device 414 into the first data segment 658 and into a second data segment 656 where the latter one is associated with time intervals which are between two consecutive construction jobs undertaken by the second subscriber 404. Such time intervals are representative of stand-by periods during which the second subscriber 404 is located in a construction job site without undertaking any construction job and/or is waiting to be assigned with another construction job. For example, the server 112 is configured to associate a first stand-by data 624 to the second data segment 656 since the first stand-by data 624 is a portion of the sound data gathered during an interval of time delimited by the first ending checkpoint 604 and the second starting checkpoint 606.

Similarly, the server 112 may be configured to associate a second stand-by data 628, a third stand-by data 632 and a fourth stand-by data 636 to the second data segment 656. Indeed:
- the second stand-by data 628 is a portion of the sound data gathered during an interval of time delimited by second ending checkpoint 608 and the third starting checkpoint 610;
- the third stand-by data 632 is a portion of the sound data gathered during an interval of time delimited by third ending checkpoint 612 and the fourth starting checkpoint 614; and
- the fourth stand-by data 636 is a portion of the sound data gathered during an interval of time delimited by fourth ending checkpoint 616 and the fifth starting checkpoint 618.

As a result of the fourth preliminary analysis executed by the server 112, at least some of the subscriber device data of the second subscriber device 414 (i.e., raw data) is structured into the training data for training the fourth MLA 358. In this case, the training data for training the fourth MLA 358 comprises the first data segment 658, the second data segment 656 and the time rate data associated with each construction job data in the first data segment 658. The server 112 is configured to store the training data for training the fourth MLA 358. In other embodiments, the server 112 may be configured to train the fourth MLA 358 upon terminating the fourth preliminary analysis.

Training of the 4$^{th}$ MLA

After executing the fourth preliminary analysis, the server 112 is configured to input the training data of the fourth MLA 358 into the fourth MLA 358. Based on the training data inputted into the fourth MLA 358, the fourth MLA 358 is trained to recognise data patterns that are indicative of construction jobs undertaken by the second subscriber 404. The fourth MLA 358 may be trained to recognise data patterns in the first data segment 658. In other words, the fourth MLA 358 may be trained to recognise data patterns that are implicit in the sound data associated with each one of the data sub-segments in the first data segment 658. More specifically, the fourth MLA 358 may be trained to recognise data patterns that are implicit in the sound data associated with the first data sub-segment 650, the second data sub-segment 652 and the third data sub-segment 654, respectively. This means that the fourth MLA 358 may be trained to recognise which data patterns of the sound data are associated with demolition jobs. The fourth MLA 358 may be trained to also recognise which data patterns of the sound data are carpentry jobs. The fourth MLA 358 may be trained to also recognise which data patterns of the sound data are associated with welding jobs. The fourth MLA 358 may recognise the data patterns based on a variety of sound data characteristics such as frequencies, pitches, durations, loudness, timbers, sonic textures, noises and the like, and, then, associate the data patterns to particular types of construction jobs having been undertaken.

Additionally, the fourth MLA 358 may be trained to attribute a time rate to each construction job. Indeed, since the time rate data of each construction job data is part of the training data that is inputted into the fourth MLA 358, the fourth MLA 358 may be trained to estimate for each data pattern being indicative of any construction job having been undertaken a respective time rate based on the respective data pattern. The fourth MLA 358 may be trained to recognize associations between the time rates charged by the particular construction worker and amounts of time in the time intervals associated with the respective data patterns.

In other embodiments, based on the training data inputted into the fourth MLA 358, the fourth MLA 358 may be trained to recognise data patterns that are indicative of stand-by periods during which the second subscriber 404 is located in a construction job site without undertaking any construction job and/or is waiting to be assigned with another construction job. For example, the fourth MLA 358 may be trained to recognise data patterns in the second data segment 656. In other words, the fourth MLA 358 may be trained to recognise data patterns that are implicit in the sound data associated with the first stand-by data 624, the second stand-by data 628, the third stand-by data 632 and the fourth stand-by data 636.

Therefore, the fourth MLA 358 may be trained to recognise data patterns that are implicit in the sound data and that are indicative of stand-by periods during which the second subscriber 404 is located in a construction job site without undertaking any construction job and/or is waiting to be assigned with another construction job. Indeed, the recognition of such data patterns may be desired during an in-use phase of the fourth MLA 358 since some sound frequencies with stand-by periods may be similar to some sound frequencies associated with a given construction job because a given construction worker is still located in the construction job site. However, the data pattern associated with the given construction job may be different from the data pattern associated with the given stand-by period because the volume, loudness and/or pitches, for example, may be different since the given construction worker may be located further from the given construction job during the stand-by period than if the given construction worker was undertaking the given construction job.

In some embodiments, recognition of the data patterns that are indicative of stand-by periods may allow the fourth MLA 358 to recognise more accurately the data patterns that are indicative of construction jobs having been undertaken.

The server 112 is configured to train the fourth MLA 358 in order to apply its respective logical analysis to the plurality of data types which, in this case, comprises a sound data type and the temporal data type. An in-use phase of the fourth MLA 358 during which the fourth MLA 358 applies its respective logical analysis will be further described below.

It should be noted that the server 112 may apply a respective preliminary analysis for each one of the second MLA 354, the third MLA 356 and the fifth MLA 360 similarly to how the server 112 applied the first preliminary analysis for the first MLA 352 and the fourth MLA 358. It should be noted that the server 112 may respectively train each one of the second MLA 354, the third MLA 356 and the fifth MLA 360 similarly to how the server 112 trained the first MLA 352 and the fourth MLA 358 for applying their respective logical analyses.

As mentioned above, the server 112 is configured to acquire the device data 160 depicted in FIG. 2 via the device data packet 120 from the mobile device 104 associated with the user 102.

Generally speaking, the server 112 may be configured to classify the user 102 with at least one occupational class amongst the plurality of occupational classes 302 based on the device data 160. Indeed, the device data 160 comprises information being indicative of at least one occupation of the user 102. This, based on the information being indicative of at least one occupation of the user 102, the server 112 may associate the user 102 with the at least one occupational class amongst the plurality of occupational classes 302.

In some embodiments, the server 112 may classify the user 102 based on the application data 202 associated with the mobile device 104. For example, the server 112 may associate the user 102 with the taxi driver class 306 if the application data 202 associated with the mobile device 104 comprises data associated with a taxi driving application implemented by the mobile device 104. In other embodiments, the server 112 may classify the user 102 based on the user specific data 204 associated with the mobile device 104. For example, the server 112 may associate the user 102 with the taxi driver class 306 if the user specific data 204 associated with the mobile device 104 comprises data indicative of the user 102 identifying himself/herself as being a taxi driver. In additional embodiments, the server 112 may classify the user 102 based on a heuristic analysis of the device data 160 of the mobile device 104.

After associating the user 102 with a particular occupational class amongst the plurality of occupational classes 302, the server 112 may be configured to extract the dataset from the device data 160 of the mobile device 104 in order to apply the respective logical analysis of a particular MLA associated with the particular occupational class.

First Scenario

In a first scenario, the server 112 may be configured to associate the user 102 with the taxi driver class 306 based on the information indicative of the at least one occupation of the user 102. In this case, the information indicative of the at least one occupation of the user 102 may be indicative of the user 102 being a taxi driver.

The server 112 may be configured to extract from the device data 160 of the mobile device 104 the dataset which comprises data associated with the plurality of data types on which the first MLA 352 (i.e., associated with the taxi driver class 306) was trained to apply its respective logical analysis.

In this case, the server 112 may be configured to extract the GPS data 206 (i.e., associated with the GPS data type) and the temporal data 210 (i.e., associated with the temporal data type) from the device data 160 of the mobile device 104. In order to apply the logical analysis of the first MLA 352, the server 112 inputs the dataset comprising the GPS data 206 and the temporal data 210 into the first MLA 352.

The first MLA 352 may apply its logical analysis on the dataset and, as a result, recognize at least one data pattern in the dataset that is indicative of at least one occupational event performed by the user 102. In this case, the first MLA 352 may recognize that the user 102 performed one occupational event associated with the first event type 316 "Taxi Ride". The first MLA 352 will estimate a fare price associated with the one occupational event performed by the user 102.

In other words, the first MLA 352 may determine that the user 102 offered one taxi ride and charged a client the estimated fare price for it. In this case, the server 112 may determine that the estimated fare price is an income value associated with the user 102 and is representative of the income of the user 102 of the mobile device 104.

Second Scenario

In a second scenario, the server 112 may be configured to associate the user 102 with the construction worker class 312 based on the information indicative of the at least one occupation of the user 102. In this case, the information indicative of the at least one occupation of the user 102 may be indicative of the user 102 being a construction worker.

The server 112 may be configured to extract from the device data 160 of the mobile device 104 the dataset which comprises data associated with the plurality of data types on which the fourth MLA 358 (i.e., associated with the construction worker class 312) was trained to apply its respective logical analysis.

In this case, the server 112 may be configured to extract sound data (i.e., associated with the sound data type) from the sensor data 208 and the temporal data 210 (i.e., associated with the temporal data type) from the device data 160 of the mobile device 104. In order to apply the logical analysis of the fourth MLA 358, the server 112 inputs the dataset comprising the sound data of the mobile device 104 and the temporal data 210 of the mobile device 104 into the fourth MLA 358.

The fourth MLA 358 may apply its logical analysis on the dataset and, as a result, recognize a first data pattern and a second data pattern in the dataset that is indicative of a first occupational event and of a second occupational event, respectively, performed by the user 102. In this case, the fourth MLA 358 may recognize that the user 102 performed the first and the second occupational events which are respectively associated with the sixth event type 326 "Demolition" and with the eighth event type 330 "Welding". The fourth MLA 358 will estimate a respective time rate associated with the first occupational event and the second occupational event performed by the user 102.

In other words, the fourth MLA 358 may determine that the user 102 undertook a demolition job at a first time rate and a welding job at a second time rate. In this case, the server 112 may determine that a first income value associated with the user 102 is the first time rate multiplied by the amount of time associated with the first occupational event (i.e., interval of time associated with the first data pattern). The server 112 may determine that a second income value is the second time rate multiplied by the amount of time associated with the second occupational event (i.e., interval of time associated with the second data pattern). The server 112 may determine that a total income value is the sum of the first income value and of the second income value. The server 112 may determine that the total income value associated with the user 102 and is representative of the income of the user 102 of the mobile device 104.

Third Scenario

In another embodiment of the present technology, the server 112 may be configured to classify the user 102 as being associated with more than one occupational class in the occupational data table 300 depicted in FIG. 3. Indeed, the server 112 may be configured to associate the user 102 with the more than one occupational class based on the information indicative of the at least one occupation of the user 102. In this case, the information indicative of the at least one occupation of the user 102 may be indicative of the user 102 being a taxi driver and a construction worker.

For example, the server 112 may associate the user 102 with the taxi driver class 306 if the application data 202 associated with the mobile device 104 comprises data associated with the taxi driving application implemented by the mobile device 104. However, the server 112 may associate the user 102 with the construction worker class 312 if the application data 202 associated with the mobile device 104 also comprises data associated with the construction management application implemented by the mobile device 104. In this case, the server 112 may classify the user 102 as being a taxi driver and a construction worker.

The server 112 is configured to extract the GPS data 206 and the temporal data 210 from the device data 160 of the mobile device 104 in order to apply the logical analysis of the first MLA 352.

The server 112 is also configured to extract the sound data from the sensor data 208 and the temporal data 210 from the device data 160 of the mobile device 104 in order to apply the logical analysis of the fourth MLA 358.

In order to apply the logical analysis of the first MLA 352, the server 112 inputs a first dataset comprising the GPS data 206 and the temporal data 210 of the mobile device 104 into the first MLA 352.

In order to apply the logical analysis of the fourth MLA 358, the server 112 inputs the dataset comprising the sound data of the mobile device 104 and the temporal data 210 of the mobile device 104 into the fourth MLA 358.

The first MLA 352 may apply its logical analysis on the dataset and, as a result, recognize a first data pattern in the dataset that is indicative of a first occupational event performed by the user 102. In this case, and similarly to the first scenario, the first MLA 352 may recognize that the user 102 performed the first occupational event associated with the first event type 316 "Taxi Ride". The first MLA 352 will estimate the fare price associated with the first occupational event performed by the user 102.

In other words, the first MLA 352 may determine that the user 102 offered one taxi ride and charged the client the estimated fare price for it. The server 112 may determine that the estimated fare price is the first income value associated with the user 102.

The fourth MLA 358 may apply its logical analysis on the dataset and, as a result, recognize a second data pattern and a third data pattern in the dataset that is indicative of a second occupational event and of a third occupational event, respectively, performed by the user 102. In this case, and similarly to the second scenario, the fourth MLA 358 may recognize that the user 102 performed the second and the third occupational events which are respectively associated with the sixth event type 326 "Demolition" and with the eighth event type 330 "Welding". The fourth MLA 358 will estimate a respective time rate associated with the second occupational event and the third occupational event performed by the user 102.

In other words, the fourth MLA 358 may determine that the user 102 undertook a demolition job at the first time rate and a welding job at the second time rate. In this case, the server 112 may determine that a second income value associated with the user 102 is the first time rate multiplied by the amount of time associated with the second occupational event (i.e., interval of time associated with the second data pattern). The server 112 may determine that a third income value associated with the user 102 is the second time rate multiplied by the amount of time associated with the third occupational event (i.e., interval of time associated with the third data pattern).

As a result, the server 112 may determine that a total income value of the user 102 is the sum of the first income value, the second income value and the third income value and is representative of the income of the user 102.

In some embodiments of the present technology, the server 112 may be configured to execute a method 700 depicted in FIG. 7 of determining an income of a user of a mobile device. Various steps of the method 700 will now be described.

STEP 702: Acquiring Device Data Associated with the User of the Mobile Device The method 700 begins at step 702 with the server 112 acquiring the device data 160 associated with the user 102 of the mobile device 104 depicted in FIG. 1.

The device data 160 comprises information indicative of at least one occupation of the user 102. In one embodiment, the application data 202 of the device data 160, depicted in FIG. 2, may comprise the information indicative of at least one occupation. In another embodiment, the user specific data 204 of the device data 160 may comprise the information indicative of at least one occupation. In yet other embodiments, the user specific data 204 of the device data 160 may comprise the information indicative of at least one occupation. In additional embodiments, the information indicative of at least one occupation may be determined via a heuristic analysis of the device data 160.

STEP 704: Associating the User with a First Occupational Class Based on the Information Indicative of the at least One Occupation of the User The method 700 continues to step 704 with the server 112 associating the user 102 with a first occupational class amongst the plurality of occupational classes 302 depicted in FIG. 3 based on the information indicative of the at least one occupation of the user 102.

The plurality of occupational classes 302 comprises the taxi driver class 306, the delivery driver class 308, the painter class 310, the construction worker class 312 and the waiter class 314. As mentioned above however, each occupational class in the plurality of occupational classes 302 is created by the operator of the server 112. Needles to say, the plurality of occupational classes 302 may comprise a large number of distinct occupational classes which will depend on various implementations of the present technology. Therefore, it should be noted that the plurality of occupational classes 302 comprising the five distinct occupational classes is illustrated in FIG. 3 for ease of understanding only and may comprise more or less than the five distinct occupational classes.

For example, the server 112 may associate the user 102 with the taxi driver class 306 (i.e., the first occupational class) based on the information indicative of the at least one occupation of the user 102.

As depicted in FIG. 3, each occupational class amongst the plurality of occupational classes 302 is associated with at least one event type and a respective MLA amongst the plurality of MLAs 350. Therefore, the first occupational class being the taxi driver class 306 is associated with at least one event type being the first event type 316 "Taxi ride" and the first MLA 352.

In some embodiments, the server 112 may associate the user 102 with the first occupational class and a second occupational class amongst the plurality of occupational classes 302 based on the information indicative of the at least one occupation of the user 102. For example, the server 112 may associate the user 102 with the taxi driver class 306 (i.e., the first occupational class) and the construction worker class 312 (i.e., the second occupational class) based on the information indicative of the at least one occupation of the user 102. The second occupational class being the construction worker class 312 is associated with the sixth event type 326 "Demolition", the seventh event type 328 "Carpentry" and the eighth event type 330 "Welding" as well as the fourth MLA 358.

STEP 706: Extracting a Dataset from the Device Data Based on the Occupational Class The method 700 continues to step 706 with the server 112 extracting a first dataset from the device data 160 based on the first occupational class. The first dataset comprises data of a first plurality of data types.

In the case where the first occupational class is the taxi driver class 306, the server 112 extracts the GPS data 206 (i.e., associated with the GPS data type) and the temporal data 210 (i.e., associated with the temporal data type) from the device data 160 of the mobile device 104. Therefore, the first dataset comprises GPS data 206 and the temporal data 210 being of the first plurality of data types which comprises the GPS data type and the temporal data type. Since the first MLA 352 associated with the first occupational class has been trained on data of the first plurality of data types, the server 112 extracts the first dataset comprising data of the first plurality of data types.

In some embodiments, where the user 102 has been further associated with the second occupational class, the server 112 may extract a second dataset from the device data 160 based on the second occupational class. The second dataset comprises data of a second plurality of data types.

In the case where the second occupational class is the construction worker class 312, the server 112 extracts sound data (i.e., associated with the sound data type) from the sensor data 208 and the temporal data 210 (i.e., associated with the temporal data type) from the device data 160 of the mobile device 104. Therefore, the second dataset comprises sound data and the temporal data 210 being of the second plurality of data types which comprises the sound data type and the temporal data type. The server 112 extracts the second dataset comprising data of the second plurality of data types because the fourth MLA 358 associated with the second occupational class has been trained on data of the second plurality of data types.

STEP 708: Applying a Logical Analysis of the MLA to the Dataset

The method 700 continues to step 708 with the server 112 applying a first logical analysis of the first MLA 352 to the first dataset. As mentioned above, the first MLA 352 has been trained to apply the first logical analysis to data of the first plurality of data types.

Applying the first logical analysis of the first MLA 352 comprises extracting, via the first MLA 352, from the first dataset a first data pattern being indicative of a first occupational event performed by the user 102. Moreover, the first data pattern extracted will be associated with one of the at least one event types.

The first MLA 352 may recognize, in the first dataset, at least one data pattern in the first dataset that is indicative of at least one occupational event performed by the user 102. In this case, the first MLA 352 may recognize that the user 102 performed one occupational event associated with the first event type 316 "Taxi Ride". The first data pattern will comprise at least some GPS data and at least some temporal data from the first dataset which is indicative of one occupational event being a taxi ride.

Additionally, applying the first logical analysis of the first MLA 352 comprises determining the first income value associated with the first occupational event based on the first data pattern. Indeed, the first MLA 352 may be previously trained to recognize associations between the fare prices charged and amounts of time in the time intervals associated with the data patterns being indicative of taxi rides. Additionally, the first MLA 352 may be previously trained to recognize associations between the fare prices charged and the geographical distances having been travelled and that are associated with the data patterns being indicative of taxi rides. Therefore, based on at least one of the amount of time in the time interval associated with the first data pattern and the geographical distance having been travelled that is associated with the first data pattern, the server 112 may determine the first income value associated with the first occupational event.

In other words, the first MLA 352 may determine that the user 102 offered one taxi ride and charged a client the estimated fare price for it. In this case, the server 112 may determine that the estimated fare price is an income value associated with the user 102 and is representative of the income of the user 102 of the mobile device 104.

In other embodiments of the present technology, the server 112 may apply a fourth logical analysis of the fourth MLA 358 to the second dataset. As mentioned above, the fourth MLA 358 has been trained to apply the fourth logical analysis to data of the second plurality of data types.

Applying the fourth logical analysis of the fourth MLA 358 comprises extracting, via the fourth MLA 358, from the second dataset a second data pattern being indicative of a second occupational event performed by the user 102. Moreover, the second data pattern extracted will be associated with one of the at least one event types. In other embodiments, applying the fourth logical analysis of the fourth MLA 358 comprises extracting, via the fourth MLA 358, from the second dataset a third data pattern being indicative of a third occupational event performed by the user 102. Moreover, the third data pattern extracted will be associated with one of the at least one event types.

For example, the fourth MLA 358 may apply its logical analysis on the dataset and, as a result, recognize the second data pattern and the third data pattern in the second dataset where the second data pattern and the third data pattern are indicative of the second occupational event and of the third occupational event, respectively, performed by the user 102. In this case, the fourth MLA 358 may recognize that the user 102 performed the second and the third occupational events which are respectively associated with the sixth event type 326 "Demolition" and with the eighth event type 330 "Welding". In other words, the fourth MLA 358 may determine that the user 102 undertook a demolition job and a welding job, aside from offering a taxi ride as determined by the first MLA 352.

Applying the fourth logical analysis of the fourth MLA 358 comprises determining a second income value associated with the second occupational event based on the second data pattern. Also, applying the fourth logical analysis of the fourth MLA 358 comprises determining a third income value associated with the third occupational event based on the third data pattern. The fourth MLA 358 will estimate a respective time rate associated with the second occupational event (i.e., the demolition job) and the third occupational event (i.e., the welding job) performed by the user 102.

As mentioned above, the fourth MLA 358 may be previously trained to recognize associations between time rates and amounts of time in the time intervals associated with the respective data patterns being indicative of respective construction jobs. Therefore, the fourth MLA 358 may determine that the user 102 undertook the demolition job at the first time rate and the welding job at the second time rate.

In this case, the server 112 may determine that a second income value associated with the second data pattern is the first time rate multiplied by the amount of time associated with the second occupational event (i.e., interval of time associated with the second data pattern). The server 112 may determine that a third income value associated with the third data pattern is the second time rate multiplied by the amount of time associated with the third occupational event (i.e., interval of time associated with the third data pattern).

In additional embodiments, the server 112 may determine a total income value based on the first income value associated with the first data pattern, the second income value associated with the second data pattern and the third income value associated with the third data pattern. In other words, the server 112 may determine the total income value of the user 102 by summing the first income value associated with the taxi ride, the second income value associated with the demolition job and the third income value associated with the welding job. The total income value is representative of the income of the user 102 of the mobile device 104.

In some embodiments of the present technology, the server 112 may be configured to execute the method 700 for each user within a plurality of users (not depicted) similarly to how the server 112 executed the method 700 for the user 102 of the mobile device 104. Indeed, by executing the method 700 for each user of the plurality of users, the server 112 may determine a respective total income value of each user within the plurality of users. Let's suppose that the plurality of users comprises the user 102 and a second user (not depicted). In this case, the server 112 may be further configured to rank the user 102 and the second user relative to each other based on their respective total income values. It should be noted that if the user 102 is associated with a first income value and the second user is associated with a second income value, the server 112 will be configured to rank the user 102 and the second user relative to each other based on the first income value and the second income value. As a result, the server 112 may rank users in the plurality of users based on their respectively associated discrete income values being representative of the respective incomes of the users in the plurality of users.

Furthermore, the server 112 may be configured to store a ranked list of users in the plurality of users in the server storage 114 for further use thereof. In other embodiments, the server 112 may be configured to store the ranked list of users in the plurality of users remotely on any storage being in communication, directly or indirectly, with the server 112.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of determining an income of a user of a mobile device, the method being executable at a server, the mobile device being communicatively coupled to the server, the method comprising:
    acquiring, by the server, device data associated with the user of the mobile device, the device data comprising information indicative of at least one occupation of the user;
    associating, by the server, the user with a first occupational class amongst a plurality of occupational classes based on the information indicative of the at least one occupation of the user, the first occupational class being a taxi driver class, the taxi driver class being associated with at least one event type and a first Machine Learning Algorithm (MLA);
    extracting, by the server, a first dataset from the device data based on the taxi driver class, the first dataset comprising data of a first plurality of data types, the first plurality of data types having been pre-determined for the taxi driver class;
    applying, by the server, the first MLA to the first dataset, the first MLA having been trained on data of the first plurality of data types of the taxi driver class and income data for the at least one event type of the taxi driver class, the first MLA having been trained to determine occupational events of the at least one event type and estimated income data for the respective occupational events based on inputted datasets, the applying comprises:
        determining, by the first MLA, from the first dataset a first data pattern being indicative of a first occupational event performed by the user, the first data pattern being associated with one of the at least one event type;
        determining, by the first MLA, estimated income data for the first occupational event based on the first data pattern; and
        determining, by the first MLA, a first income value associated with the first occupational event based on the first data pattern and the estimated income data, the first income value being representative of the income of the user of the mobile device.

2. The method of claim 1, wherein the first plurality of data types comprises GPS data and temporal data.

3. The method of claim 1, wherein the applying further comprises:
    determining, by the first MLA, from the first dataset a second data pattern being indicative of a second occupational event performed by the user, the second data pattern being associated with one of the at least one event type;
    determining, by the first MLA, second estimated income data for the second occupational event based on the second data pattern; and
    determining, by the first MLA, a second income value associated with the second occupational event based on the second data pattern and the second estimated income data; and wherein
    the method further comprises determining, by the server, a total income value based on the first income value and the second income value, the total income value being representative of the income of the user of the mobile device.

4. The method of claim 3, wherein the at least one event type comprises more than one event types, and wherein the first data pattern and the second data pattern are respectively associated with distinct event types amongst the more than one event types.

5. The method of claim 1, wherein the method further comprises:
    determining, by the first MLA, a second income value for a second user of a second mobile device; and
    ranking, by the server, the user and the second user relative to each other based on the first outcome value and the second outcome value.

6. A server for determining an income of a user of a mobile device, the mobile device being communicatively coupled to the server, the server being configured to:
- acquire device data associated with the user of the mobile device, the device data comprising information being indicative of at least one occupation of the user;
- associate the user with a first occupational class amongst a plurality of occupational classes based on the information being indicative of the at least one occupation of the user, the first occupational class being a taxi driver class, the taxi driver class being associated with at least one event type and a first Machine Learning Algorithm (MLA);
- extract a first dataset from the device data based on the taxi driver class, the first dataset comprising data of a first plurality of data types, the first plurality of data types having been pre-determined for the taxi driver class;
- apply the first MLA to the first dataset, the first MLA having been trained on data of the first plurality of data types of the taxi driver class and income data for the at least one event type of the taxi driver class, the first MLA having been trained to determine occupational events of the at least one event type and estimated income data for the respective occupational events based on inputted datasets, to apply comprises the server being configured to:
  - determine, by the first MLA, from the first dataset a first data pattern being indicative of a first occupational event performed by the user, the first data pattern being associated with one of the at least one event type;
  - determine, by the first MLA, estimated income data for the first occupational event based on the first data pattern; and
  - determine, by the first MLA, a first income value associated with the first occupational event based on the first data pattern and the estimated income data, the first income value being representative of an income of the user of the mobile device.

7. The server of claim 6, wherein the first plurality of data types comprises GPS data and temporal data.

8. The server of claim 6, to apply further comprises the server being configured to:
- determine, by the first MLA, from the first dataset a second data pattern being indicative of a second occupational event performed by the user, the second data pattern being associated with one of the at least one event type;
- determine, by the first MLA, second estimated income data for the second occupational event based on the second data pattern; and
- determine, by the first MLA, a second income value associated with the second occupational event based on the second data pattern and the second estimated income data; and wherein the server is further configured to determine a total income value based on the first income value and the second income value, the total income value being representative of the income of the user of the mobile device.

9. The server of claim 8, wherein the at least one event type comprises more than one event types, the first data pattern and the second data pattern are respectively associated with distinct event types amongst the more than one event types.

10. The server of claim 6, the server being further configured to:
- determine, by the first MLA, a second income value for a second user of a second mobile device; and
- rank the user and the second user relative to each other based on the first outcome value and the second outcome value.

* * * * *